United States Patent [19]
Brelig et al.

[11] Patent Number: 6,003,557
[45] Date of Patent: Dec. 21, 1999

[54] REMOVABLE SEALING PLUG

[75] Inventors: William D. Brelig, Ivoryton; Brian T. Moore, Westbrook, both of Conn.

[73] Assignee: The Lee Company, Westbrook, Conn.

[21] Appl. No.: 08/992,289

[22] Filed: Dec. 17, 1997

[51] Int. Cl.$^6$ .................................................. F16L 55/10
[52] U.S. Cl. .............................. 138/89; 138/90; 138/96 T
[58] Field of Search ........................... 138/89, 90, 96 R, 138/96 T

[56] References Cited

U.S. PATENT DOCUMENTS

| | | | |
|---|---|---|---|
| 3,702,707 | 11/1972 | Rosan, Jr. | 138/89 X |
| 4,602,500 | 7/1986 | Kelly | 138/90 X |

Primary Examiner—Patrick Brinson
Attorney, Agent, or Firm—Philip J. Lee

[57] ABSTRACT

A removable, expansion sealing plug has an annular seal formed of an elastic material, which seal is expanded by a fruste-conical expansion member when the expansion member is drawn into a retention member, the retention member having an outer surface with screw threads, and the expansion member being rotationally fixed, but axially movable, relative to the retention member. When installed, retention member screw threads fix the plug in position and prevent forcible expulsion from the installation hole and the expansion of the seal causes compression of the seal between the wall of the installation hole and the expansion member and frictional interference between the seal and the installation hole and between the seal and the expansion member, thereby preventing the rotation of the plug within the installation hole.

15 Claims, 3 Drawing Sheets

REMOVABLE SEALING PLUG

BACKGROUND OF THE INVENTION

A. Field of Invention

The present invention relates generally to sealing plugs and more particularly to a new and improved sealing plug for removably sealing access holes and other bores in metal castings, metal forgings and other metal parts, particularly those exposed to high pressure and/or vibration.

B. Description of Related Art

A variety of types of plugs have been designed for sealing hydraulic and other fluid systems, including simple expansion plugs as well as relatively complex plugs. High system pressures frequently require positive means of retaining the plugs, particularly when the opening to be plugged is large. A large opening results in an increased expelling force exerted on the plug, as a greater surface area is exposed to the system pressure. A commonly used design feature of plugs designed to seal large openings under high pressure is to mate male screw threads on the exterior of the plug with female screw threads in the interior of the installation site. The relatively high retentive force provided by the mated threads provides the ability to use large plugs that resist expulsion by high system pressures. A difficulty of the use of threaded plugs is that the plugs tend to loosen, allowing the plug to rotate and eventually back out, when the plug and/or the installation site are subjected to vibration. One method of design intended to prevent the unscrewing of threaded plugs includes using glues, plastics or other binding agents on the threads. Using permanent glues hinders removal and other types of binding agents that allow removal frequently are not reusable or have limited reusability. Another design used to prevent unscrewing is the locking ring type plug, similar in principle to the fitting shown in U.S. Pat. No. 3,702,707 to Rosan. Rosan describes the use of a ring that slides over, but is rotationally fixed relative to the fitting body. The Rosan ring has a serrated outer surface and inner surfaces with outer splines that are inserted into matching serrations in the boss of the installation site and inner splines that are to be inserted into matching serrations in the fitting body. The body also has screw threads that seal and secure the body within the opening to be plugged. The inner ring splines prevent rotation of the body relative to the locking ring and the outer ring splines prevent the ring from rotating in the installation site. A disadvantage of the locking ring type plug is the requirement of an adaption of the opening by the relatively complicated and time consuming formation of the serrations at the mouth of the installation boss which must be relatively large as a result. Since the locking ring is driven into the installation opening, the ring itself may back out of locking position and therefore a means of locking the locking ring is required. In addition, the installation of a locking ring type of plug requires that the plug body serrations, and the installation boss serrations must exactly line up to engage the ring splines. For this reason it is necessary to adjust the rotational position of the plug until a proper alignment is achieved, a somewhat time consuming and delicate process. A further disadvantage of the locking ring type design is that the necessity of locking the ring in place makes it difficult to make a plug that is flush or nearly flush with the surface of the installation site. Plugs of this type also frequently employ elastomeric seals that have limited useful lives and limited usefulness in some temperature conditions or applications involving incompatible substances.

Therefore, what is desired is a plug that is reusable, economic to manufacture, easy to install, useful in a wide range of conditions and that resists the influence of extraneous vibration and can be configured to be flush with the surface of the installation site when installed, without unnecessary weight.

SUMMARY OF THE INVENTION

The invention herein described is a new and improved plug means for sealing openings against high pressure fluids. The high pressure sealing plug comprises a generally cylindrical seal member, an externally threaded retention member, and a tapered expansion member. The seal member, retention member, and expansion member are all mutually coaxial and are generally symmetrical about the common axis. The expansion member is formed to engage the seal member at one end and to be received into the retention member at the other end. The seal engaging end of the expansion member has an outer surface that is axially tapered forming a fruste-conical seal engaging surface, with the outer end, toward the retention member, having a smaller diameter than the inner end, that is to be toward the interior of the installation hole. The seal member is generally annular and formed of a material that is softer, more elastic than the expansion member and selected from materials, frequently metals that are compatible with the conditions of the anticipated application. In a preferred embodiment, polyamide-imide is used for the seal member. The outer surface of the seal member has a series of annular, circumferential grooves that aid in the compliance and elasticity of the seal member. The sealing plug is assembled with the seal member surrounding a part of the smaller and of the tapered outer surface of the expansion member. The seal member, which has an inner surface that is tapered to correspond to and snugly fit around the tapered outer surface of the expansion member. The retention member has a radially outer surface that is threaded with male screw threads and an inner surface that forms a passage that is hexagonal in cross section and is suitably sized to receive an "Allen" type wrench. The expansion member further comprises a second outer surface that is hexagonal in cross section and is sized to be received within the hexagonal passage in the retention member. When the sealing plug is assembled, the expansion member is rotationally fixed relative to the retention member by the engagement of the hexagonal outer surface of the expansion member in the hexagonal inner surface of the retention member. An annular shoulder is formed on the expansion member at the transition between the tapered surface and the smaller diameter hexagonal surface, which shoulder corresponds to and opposes a beveled shoulder formed at the inner rim of the opening to the interior of the retention member. The expansion member is not completely fixed against limited axial movement relative to the retention member. An annular spring retained within the retention member corresponds to a pair of axially spaced, annular grooves on the exterior of the expansion member to provide a detent, releasably securing the expansion member and retention member against being unintentionally separated without preventing the forcible retraction of the expansion member into the retention member. The spring and grooves also help keep the expansion member in place relative to the retention member after installation as described below. The retention member has a flat annular surface at the end that receives the inserted expansion member, which flat annular surface corresponds to and opposes a flat annular surface at the end of the seal member that is toward the retention member, such that the seal member is prevented from axial movement relative to the retention member. The expansion member further comprises an internal blind bore that opens toward the retentive member when assembled, which inner bore is threaded with female screw threads to receive an expansion member retraction tool to be inserted into the threaded bore of the expansion member to provide a means for drawing the expansion member further into the retention member. The inner surface of the seal member snugly fits around the tapered outer surface of the expansion member such that the seal member is expanded when the expansion member is further inserted into the seal member. When the expansion member is retracted further into the retention member, the seal member remains in place while the tapered surface of the expansion member advances into the seal member such that the diameter of the portion of the tapered surface surrounded by the seal member increases and the seal member is thereby expanded. The advance of the expansion member into the retention member and seal member is stopped by the contact of the opposing shoulders of the expansion and retention members, thereby preventing over expansion of the seal member. The seal member comprises an annular radially inward facing lip that surrounds and engages an annular shoulder on the end of the retention member to prevent the separation of the seal and retention member during the removal process.

An installation bore into which the plug of the instant invention is to be inserted is first reamed or formed to provide an outwardly facing annular shoulder. The outer section of the installation bore causes by the reaming has a larger internal diameter, and female screw threads are then tapped in the outer section. The female screw threads on the outer section of the installation hole correspond to the male screw threads on the retention member. The sealing plug is inserted into the installation bore, being driven inward by the mating of the screw threads on the retention member and the installation bore with the application of torque by means of a wrench inserted into the hexagonal inner section of the retention member. The seal member is driven by the annular shoulder of the retention member. When the sealing plug has been driven to the appropriate depth within the installation bore, the end of the seal member will be in contact with the shoulder of the installation bore. The wrench is removed and an expansion member retraction tool is threaded into the female screw threads in the expansion member. The expansion member is then axially retracted into the retention member and since the seal member is held in its axial location by the retention member, the larger diameter portion of the fruste-conical surface of the expansion member advances into the seal member causing the seal member to be controllably radially expanded due to difference between the outside diameter of the expansion member and the inside diameter of the seal member. The forcible expansion of the seal member causes the outer surface of the seal member to sealingly and frictionally engage the inner wall of the installation hole such that the seal member is prevented from rotating relative to the installation hole, and the frictional engagement of the inner surface of the seal member with the fruste-conical surface of the expansion member prevents rotation of the expansion member relating the seal member. Since the expansion member is not able to rotate relative to the retention member, the retention member is thus prevented from rotating relative to the installation hole. In this manner, the plug is locked into place and is protected against inadvertent backing out due to vibration or other extraneous forces. In addition to the retentive forces provided by the locking spring and the engagement of the fruste-conical surface with the seal member, the expansion member is additionally urged toward the seal member by the force of the fluid being sealed acting against the broad inner face of the expansion member. In this manner, the locking method of the plug is actuated in part by the environment on which it is used. After installation of the plug, a removable cap or plug may be inserted into the hexagonal socket of the retention member to protect against contamination and/or accidental disengagement of the expansion member. Since the screw threads of the retention member are at the axially outer end of the plug, it is possible to install the plug such that the plug is flush with the surrounding surface of the installation site. The ability of the installer to visually check the position of the expansion member relative to the retention member provides the ability to verify expansion of the seal member.

Removal of the plug is performed as a reversal of the installation process, with the expansion member being forced axially inward to relieve the expansion of the seal. Once the seal member expansion is relieved, the retention member can be rotated within the installation hole to unscrew the plug. The plug may be reused and the seal member may be replaced if damaged or worn.

The principal aim of the present invention is to provide a new and improved sealing plug which meets the foregoing requirements and which is easily installed and resist disengagement caused by vibration.

Another and further object and aim of the present invention is to provide a new and improved sealing plug which will be economical to manufacture, install, and reuse.

Another and further object and aim of the present invention is to provide a new and improved sealing plug that can be flush with the surrounding surface when installed.

Other objects and advantages of the invention will become apparent from the Description of the Preferred Embodiments and the Drawings and will be in part pointed out in more detail hereinafter. The invention consists in the features of construction, combination of elements and arrangement of parts exemplified in the construction hereinafter described and the scope of the invention will be indicated in the appended claims.

DESCRIPTION OF THE PREFERRED EMBODIMENT(S)

Figure 1:
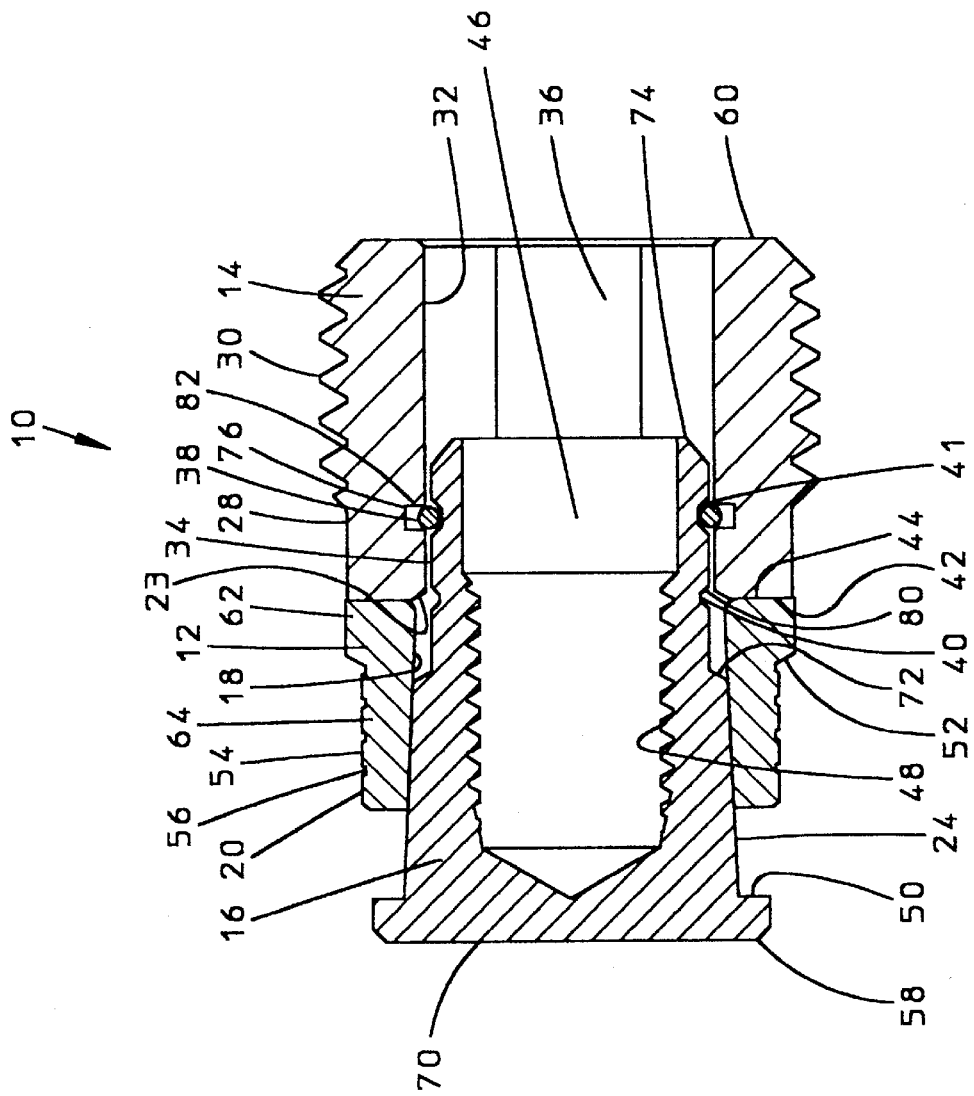
FIG. 1 is an enlarged, longitudinal section view of an installation of a preferred embodiment of a sealing plug constructed in accordance with the present invention, showing the plug assembled but not installed with unexpanded seal member.
Figure 2:
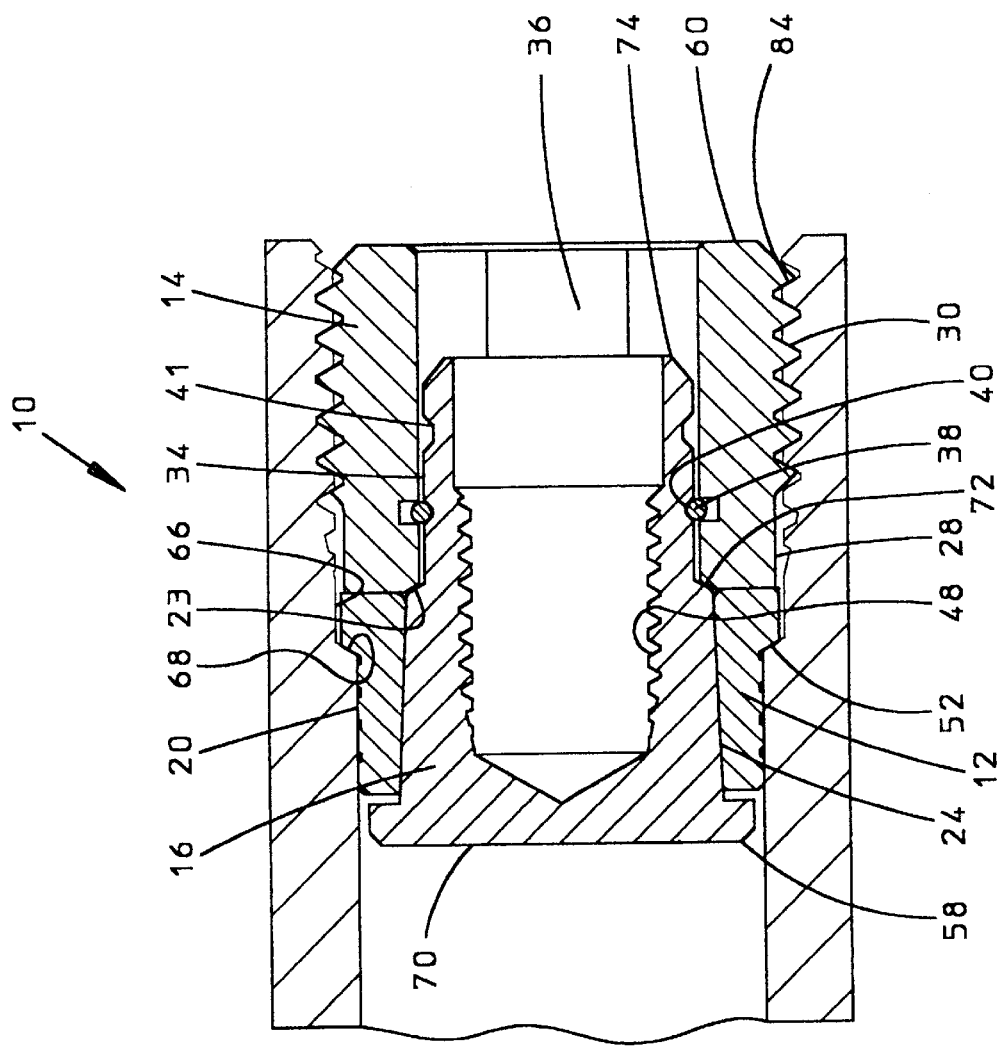
FIG. 2 is an enlarged, longitudinal section view of a preferred embodiment of a plug constructed in accordance with the present invention, showing the plug in sectional view and installed.
Figure 3:
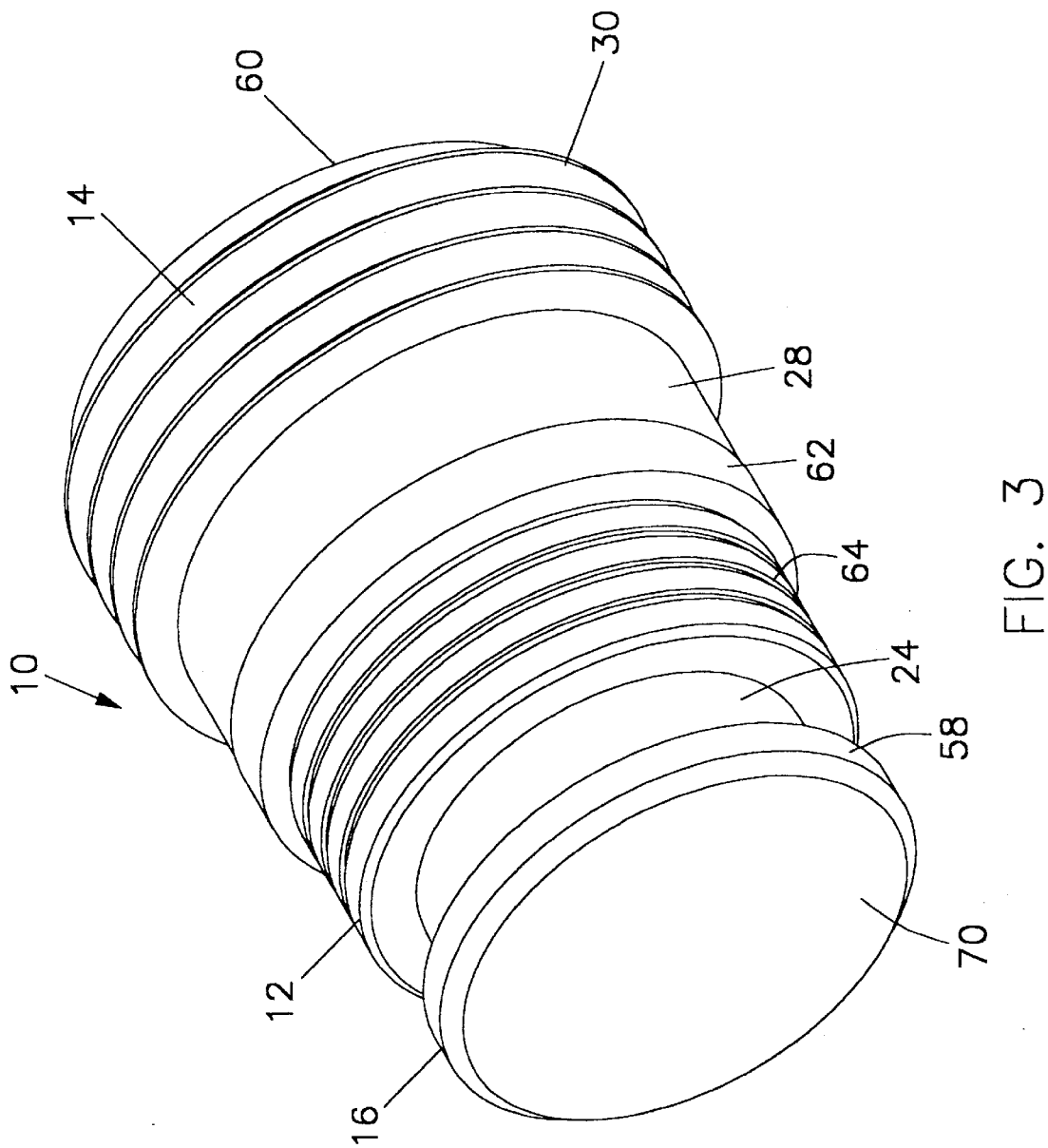
FIG. 3 is an enlarged, perspective view of a preferred embodiment of a sealing plug constructed in accordance with the present invention.

With reference to the Drawings wherein like numerals represent like parts throughout the Figures, a sealing plug in accordance with the present invention is generally designated in FIG. 1 by the numeral 10. For the purpose of clarity, sealing plug 10 will be described in reference to its normal installation; the normal installation consisting of the insertion of the plug 10 into a hole or other orifice or opening, the portion of plug 10 first entering the hole, will be considered the front or interior end, and the opposite end will be considered the outer, exterior or back end, the front end being signified by the numeral 58 in the Drawings and the rear or external end signified by the numeral 60 in the drawings. Sealing plug 10 consists of an annular seal member 12, and externally threaded retention member 14, and seal expansion member 16, all of which are coaxial and generally symmetrical about the common longitudinal axis, with exceptions as noted below.

Seal member 12 is generally cylindrical in overall shape and is symmetrical about the common central longitude axis of plug 10, and is formed of a material that is softer, more elastic than the rest of plug 10. A preferred material for seal member 12 is polyamide-imide. Seal member 12 has an outer surface 20 which comprises a section 64 of alternating circumferential lands 54 and grooves 56 and a section 62 of increased diameter with a shoulder 52 formed at the point at which the diameter of the seal member 12 increases. The grooved section 64 is toward the front end 58 of the sealing plug 10 relative to the increased diameter section 62 which is toward the back end 60 of sealing plug 10, relative to section 64. The end of seal member 12 toward back end 60 forms a flat annular surface 44 in a plane normal to the longitude axis of the sealing member 12. Seal member 12 also has an inner surface 18 that is conically tapered from a greater inside diameter toward the front end 58 to a lesser inside diameter at the end closest to the back end 60, thereby forming an inwardly facing fruste-conical surface 18. It is to be anticipated that since the taper angle of surface 18 is relatively slight, a cylindrical configuration of surface 18 could be used with acceptable results.

Expansion member 16 has a front end 70 that is generally normal to the longitude axis of the sealing plug 10. While, in the illustrated preferred embodiment, the surface of front end 70 is shaped as a flat disc, other shapes are possible and may be preferable in some circumstances, a domed shape for high pressure applications, for example. Expansion member front end 70 has an increased diameter relative to the remainder of the expansion member 16, forming a rearward facing annular shoulder 50. Expansion member 16 further comprises a first outer surface 24 that is axially conically tapered to form a fruste-conical shape, the larger diameter end of which is adjacent to the expansion member front end 70 and the smaller end of which ends at a shoulder 72 located at about the longitudinal middle of the expansion member 16. In the illustrated preferred embodiment, the taper of outer surface 24 is about one inch taper per foot, about a 4.77 degree included angle, as an example of a useful taper without precluding the usefulness of other taper angles or configurations. It is specifically anticipated that a relatively wide range of taper angles may be used as specific circumstances may allow or require. Similarly, it is anticipated that the tapered surfaces may be configured without strict adherence to uniformity of taper and/or without strict conformity between the opposing seal member and expansion member surfaces 18 and 24. First outer surface 24 corresponds to and is of slightly greater diameter than seal member inner surface 18, with both surfaces in the illustrated preferred embodiment having similar taper angles and the larger end of first outer surface 24 being of greater diameter than the larger end of seal member inner surface 18 which is only slightly larger than the smaller end of first outer surface 24. Due to the diametrical interference between the first outer surface 24 and the inner surface 18, when the first outer surface 24 is advanced into inner surface 18 by axial movement of the expansion member 16 toward the rear end of plug 10, seal member 12 is caused to expand in a radial direction. A second outer surface 34 extends from the shoulder 72 to the rear end 74 of the expansion member 16 and is hexagonal in cross section. The second outer surface 34 is smaller in diameter than the smaller end of the first outer surface 24 and an annular, rearwardly facing, beveled shoulder 72 is formed by the reduction of outer dimension from the first outer surface 24 to the second outer surface 34. The second outer surface 34 comprises two axially separated areas of reduced outer dimension 40 and 41 that extend circumferentially around the expansion member 16 in a plane normal to the axis of the expansion member 16. Areas 40 and 41 are formed by reducing the apexes of the otherwise hexagonal surface 34 to form arc shaped inner surfaces thereby forming discontinuously annular grooves. Groove area 41 is located closest to rear end 74. Expansion member 16 further comprises an internal blind bore 46 that opens toward the rear end 60 of plug 10 and is threaded with female screw threads 48 to receive a threaded expansion member retraction tool (not shown) to be inserted into the threaded bore 46 of expansion member 16 to provide a means for drawing the expansion member 16 further into the retention member 14. The outer surface 24 of expansion member 16 is preferably coated with a lubricant such as Teflon, a trademark of E.I. duPont de Nemours, Co. It will be anticipated that other lubricants may be used without departing from the spirit of the present invention and that in some applications and with some materials no additional lubricant coating may be required.

Retention member 14 comprises a radially outer surface 28 formed to provide male screw threads 30. A central passageway 36, having a hexagonal cross-section extends longitudinally through the center of retention member 14, and is suitably sized to receive the hexagonal rear end 74 of expansion member 16 at the front end of passageway 36 as well as an "Allen" type wrench, inserted at the rear opening of the passageway 36. The end of retention member 14 toward the front end 58 of plug 10 forms a flat annular surface 42 that is normal to the longitude axis of plug 10 and is approximately the same dimension as the rear surface 44 of seal member 12. The inner rim of the opening to surface 42 is beveled to form an annular, forward facing shoulder 23 that corresponds to and opposes shoulder 72 of the expansion member 16. A circular groove 76 in a plane normal to the axis of retention member 14 is formed in the inner surface 32 of the hexagonal passage 36 and receives a retention spring 38. Retention spring 38 is a split annular ring that is formed of a resilient material and compressed to fit and be retained in groove 76. Retention spring 38 is sized to be of about the same inner diameter as the groove areas 40 and 41, and of lesser diameter than the expansion member second surface 34, such that spring 38 must be radially expanded to allow insertion of expansion member 16 and once nested in either groove area 40 or 41 will tend to remain therein. Retention spring 38 is also loosely retained in groove 76 with enough room for radial expansion to allow the forcible passage of the expansion member second surface 34, without displacing spring 38 from groove 76. Retention spring 38 is ordinarily partially in groove 76 and at the same time partially in groove area 40 or 41. The walls 82 of groove 76 are perpendicular to the inner surface 32 of retention member 14 to prevent spring 38 from being displaced from groove 76, while the walls 80 of groove areas 40 and 41 are beveled and slope away from the bottom of groove areas 40 and 41 to allow spring 38 to exit and enter the groove area 40 or 41, when forced to do so. In this manner, expansion member 16 can be moved relative to retention member 14 but will resist movement from the two positions offered by groove areas 40 and 41. Except for male screw threads 30, retention member 14 is generally symmetrical about the central longitudinal axis of plug 10 and retention member 14.

Plug 10 is assembled with the seal member 12 surrounding a part of the smaller end of the tapered outer surface 24 of expansion member 16 and with the rear end of expansion member 16 inserted within hexagonal passage 36 of retention member 14 far enough that spring 38 is engaged by and partially in opposing grooves 76 and 41. The engagement of the hexagonal outer surface 24 of the expansion member rear end 74 with the hexagonal inner surface 32 of passage 36 causes the expansion member 16 to be rotationally fixed relative to the retention member 14. In the assembled plug 10, the opposing flat annular surfaces 42 and 44 of retention member 14 and seal member 12, respectively, abut each other whereby the seal member 12 is prevented from axial movement relative to the retention member 14, in the direction toward the rear end 60 of plug 10. In the assembled but uninstalled plug 10, retention spring 38 is engaged in retention member groove 76 and in expansion member groove area 41 and seal member 12 surrounds the smaller end of expansion member conical surface 24.

The first step in sealing an opening with plug 10 is to ensure that the grooved section 64 of the unexpanded seal member 12 fits within the installation bore by either select an appropriately sized plug 10 or reaming the installation bore to an appropriate diameter. An outer section of larger diameter 66 is then formed in the installation bore such that said section 66 has a diameter that is slightly larger than the retention member outer surface 28, thereby forming an outwardly facing annular shoulder 68 that corresponds to and opposes seal shoulder 52. The outer portion of the larger diameter section 66 of the installation bore is then tapped to form female screw threads 84 corresponding to the male screw threads 30 on the retention member 14. Then plug 10 is inserted into the installation bore, by means of the mating of the male screw threads 30 on the retention member 14 with the female screw threads of the installation bore, and rotation of plug 10. The plug 10 is rotated within the installation bore by means of a hexagonal wrench inserted into the rear end of the hexagonal inner passageway 36 of retention member 14. The rotation of retention member 14 drives seal member 12 until seal member shoulder 52 engages the annular shoulder 68 of the installation bore. When plug 10 is fully inserted, the wrench is removed and a expansion member retraction tool in the form of a threaded rod, is threaded into the female screw threads 48 in the rear end of expansion member 16, and expansion member 16 is then axially retracted into retention member 14, by outward force applied to the retraction tool. The retraction of expansion member 16 advances fruste-conical surface 24 of expansion member 16 into seal member 12 causing the controlled radial expansion of seal member 12. The expansion of seal member 12 causes the outer surface 20 of the seal member to frictionally, and sealingly engage the inner wall of the installation bore. Retraction of expansion member 16 into retention member 14 preferably continues until opposing shoulders 72 and 23 of the expansion member 16 and retention member 14, respectively, contact each other to prevent further retraction of expansion member 16 and further expansion of seal member 12, and spring 38 is engaged in groove area 40. When installation is complete, plug 10 is retained in the installation bore by the engagement of screw threads 30 with the installation bore screw threads, as well as the frictional engagement of seal member outer surface 20 with the installation bore. Plug 10 is prevented from rotation within the installation bore by the friction frictional engagement of seal member 12 which also frictionally engages expansion member 16 which in turn prevents the rotation of retention member 14 by the engagement of hexagonal surfaces 34 and 32. After retraction of expansion member 16, retention spring 38 is preferably engaged in expansion member groove area 40, depending upon the degree of retraction and in retention member groove 76 as well.

Removal of plug 10 requires expansion member 16 to be forced axially inward to relieve the expansion of the seal member 12, after which retention member 14 is rotated to retract plug 10 out of the installation bore. Retention spring 38 prevents the accidental separation of expansion member 16 from retention member 14 and expansion member shoulder 50 ensures that seal member is retracted with plug 10. After removal, it is possible to reuse plug 10, although it may be necessary to replace seal member 12 if damage has occurred. Replacement of seal member 12 requires the forcible separation of the expansion member 16 from the retention member 14, which is allowed by the detent provided by the locking retention spring 38.

It should be appreciated and anticipated that while the retention and expansion members 14 and 16 of plug 10 have been fabricated of aluminum, a variety of materials could be used. It is specifically anticipated that stainless steel, plastic or composite materials may be used and the differing characteristics of such materials would be design considerations. It is important that the material of expansion member 16 be formed of a material of sufficient strength to withstand the stress of installation and be able to expand seal member 12. Similarly, seal member 12 may be formed of a variety of materials, provided that the materials have the requisite elasticity to expand as required by installation, and to contract to allow removal, if removability is desired. In addition to polyamide-imide, seal member 12 has been formed of aluminum. Other materials may be used with the condition that there should be a sufficient difference in the relative hardness of the materials to avoid galling on the sliding surfaces of the seal member 12 and expansion member 16. It will further be anticipated that while seal member grooves 56 aid in providing compliance and elasticity, other configurations may be used and in the case of alternative materials may be preferred. Additionally, it will be appreciated that the plug 10 will function adequately for most purposes without the use of retention spring 38 and groove areas 40 and 41 as a retention mechanism, although the use of a retention mechanism is preferred.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A sealing plug for removably sealing a partially threaded workpiece bore, the plug comprising
   A. A threaded member comprising an outer surface that is formed with screw threads engageable with the threaded portion of the workpiece bore, and
   B. an annular seal member comprising an inner surface and an outer surface engagable with the bore and an end surface engagable with the threaded member, and
   C. a seal expansion member comprising an outer surface of fruste-conical shape engagable with the inner surface of the seal member to releasably radially expand the seal member into sealing and frictional engagement with the inner surface of the workpiece bore and to releasably force the end surface of the seal member into frictionally engagement with the threaded member, thereby securing the threaded member from rotation relative to the bore.

2. A sealing plug according to claim 1, wherein the threaded member further comprises an axially extending socket having a non cylindrical inner surface and the seal expansion member further comprises a second outer surface section having an outer surface corresponding to the non-cylindrical socket in the threaded member and being axially movable therein and rotationally fixed relative to the threaded member.

3. A sealing plug according to claim 2, wherein the fruste-conical surface of the seal expansion member comprises a first end aligned toward the threaded member and a second end of larger diameter aligned away from the threaded member and the seal member surrounds a portion of the fruste-conical surface of the seal expansion means.

4. A sealing plug according to claim 3, wherein the threaded member further comprises an annular shoulder opposing and abutting the seal member, such that axial movement of the seal member is limited and axial movement of the seal expansion member toward the threaded member causes, the fruste-conical surface of the seal expansion member to move relative to the seal member and radially expand the seal member.

5. A sealing plug according to claim 4, wherein the threaded member socket and the expansion member second outer surface section are of similar cross-sectional shape and the expansion member second outer surface section has an outside dimension slightly less than the inside dimension of the socket.

6. A sealing plug according to claim 5 wherein the cross-sectional shape of the socket and of the expansion member second outer surface section is polygonal.

7. A sealing plug according to claim 6 further comprising means for securing the seal expansion member from complete separation from the threaded member.

8. A sealing plug according to claim 7, wherein the included angle of taper of the fruste-conical surface of the seal expansion member is about 4.8 degrees.

9. A sealing plug according to claim 8, wherein the seal member further comprises a plurality of annular grooves and lands alternatingly axially spaced along the outer surface of the seal member.

10. A sealing plug according to claim 9 wherein the means for securing the seal expansion member from separation from the threaded member comprises an annular spring secured within the threaded member socket and one or more annular grooves on the expansion member second outer surface, the grooves being sized to releasably engage the spring.

11. The method of removably sealing workpiece bore comprising the steps of
   A. reaming and tapping the workpiece bore to provide a partially threaded installation bore, and
   B. inserting into the installation bore a sealing plug comprising a radially expandable sealing member and a threaded retaining member, connected to the sealing member so as to be partially axially moveable and rotationally fixed relative thereto, and
   C. engaging the screw threads of the retaining member with the screw threads of the installation bore, and
   D. rotating the retaining member within the bore until the sealing plug is firmly retained therein, and
   E. expanding the sealing member into engagement with the installation bore.

12. The method of claim 11 wherein the sealing member further comprises an annular seal formed of elastic material with an outer diameter slightly smaller than the installation bore when unexpanded and fixed against axial movement relative to the retaining member.

13. The method of claim 12 wherein the sealing member further comprises a seal expansion member with a fruste-conical surface having a first end aligned toward the retaining member and a second end of larger diameter aligned away from the retaining means and wherein the unexpanded seal surrounds a portion of the first end of the fruste-conical surface of the seal expansion member.

14. The method of claim 13 wherein the step of expanding the sealing member comprises causing the seal expansion member to move closer to the retaining member, whereby the larger end of the fruste-conical surface of the seal expansion member advances toward and into the seal and the seal is expanded.

15. The method of unsealing an aperture that has been sealed with a plug comprising a threaded retaining member and a radially expandable sealing member connected to the retaining member so as to be partially axially moveable and rotationally fixed relative thereto, the method comprising the steps of
   A. releasing the sealing member from engagement with the installation bore, and
   B. rotating the retaining member within the bore until the sealing plug is disengaged therefrom, and
   C. Removing the sealing plug from the installation bore.

* * * * *